United States Patent
Patterson et al.

(10) Patent No.: US 12,238,163 B2
(45) Date of Patent: *Feb. 25, 2025

(54) LATENCY-BASED ROUTING AND LOAD BALANCING IN A NETWORK

(71) Applicant: Adeia Media Holdings LLC, San Jose, CA (US)

(72) Inventors: Katherine E. Patterson, Mount Laurel, NJ (US); Nicholas C. Beenham, Swedesboro, NJ (US); Joy Mathew Elamthuruthy, Sicklerville, NJ (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,986

(22) Filed: Sep. 12, 2023

(65) Prior Publication Data

US 2023/0421633 A1    Dec. 28, 2023

Related U.S. Application Data

(63) Continuation of application No. 17/327,029, filed on May 21, 2021, now Pat. No. 11,799,949, which is a continuation of application No. 16/241,683, filed on Jan. 7, 2019, now Pat. No. 11,050,819, which is a continuation of application No. 15/466,583, filed on Mar. 22, 2017, now abandoned, which is a continuation of application No. 14/755,731, filed on Jun. 30, 2015, now Pat. No. 9,641,605, which is a continuation of application No. 13/363,996, filed on Feb. 1, 2012, now Pat. No. 9,106,663.

(51) Int. Cl.
*H04L 67/101* (2022.01)
*H04L 43/0852* (2022.01)
*H04L 67/1001* (2022.01)
*G06F 16/27* (2019.01)

(52) U.S. Cl.
CPC ........ *H04L 67/101* (2013.01); *H04L 43/0852* (2013.01); *H04L 67/1001* (2022.05); *G06F 16/27* (2019.01)

(58) Field of Classification Search
None
See application file for complete search history.

(56) References Cited

U.S. PATENT DOCUMENTS

| | | |
|---|---|---|
| 5,774,660 A | 6/1998 | Brendel et al. |
| 5,982,828 A | 11/1999 | Fujimori et al. |
| 7,392,421 B1 | 6/2008 | Bloomstein et al. |
| 7,401,120 B2 | 7/2008 | Walbeck et al. |
| 8,335,761 B1 | 12/2012 | Natanzon |
| 8,478,718 B1 | 7/2013 | Ranade |
| 8,700,570 B1 | 4/2014 | Marathe et al. |
| 8,838,539 B1 | 9/2014 | Ashcraft et al. |
| 9,106,663 B2 | 8/2015 | Patterson et al. |
| 9,641,605 B2 | 5/2017 | Patterson et al. |
| 11,050,819 B2 | 6/2021 | Patterson et al. |

(Continued)

FOREIGN PATENT DOCUMENTS

| | | |
|---|---|---|
| CA | 2863684 A1 | 8/2013 |
| FR | 2810416 A1 | 12/2001 |
| WO | 2013114198 A1 | 8/2013 |

*Primary Examiner* — Dustin Nguyen
(74) *Attorney, Agent, or Firm* — HALEY GUILIANO LLP

(57) ABSTRACT

Methods and systems for load balancing are described. A network node may replicate content. A lag time may be determined. A data structure may be generated that comprises the lag time.

20 Claims, 10 Drawing Sheets

(56) References Cited

U.S. PATENT DOCUMENTS

| | | |
|---|---|---|
| 11,799,949 B2 | 10/2023 | Patterson et al. |
| 2001/0039586 A1 | 11/2001 | Primak et al. |
| 2002/0143798 A1 | 10/2002 | Lisiecki et al. |
| 2002/0152305 A1 | 10/2002 | Jackson et al. |
| 2002/0165934 A1 | 11/2002 | Conrad et al. |
| 2004/0066741 A1 | 4/2004 | Dinker et al. |
| 2004/0088386 A1 | 5/2004 | Aggarwal |
| 2006/0182034 A1 | 8/2006 | Klinker et al. |
| 2006/0218210 A1 | 9/2006 | Sarma et al. |
| 2008/0010296 A1 | 1/2008 | Bayliss et al. |
| 2008/0049625 A1 | 2/2008 | Edwards et al. |
| 2009/0113051 A1 | 4/2009 | Franklin |
| 2009/0138570 A1 | 5/2009 | Miura et al. |
| 2011/0055494 A1 | 3/2011 | Roberts et al. |
| 2011/0055661 A1 | 3/2011 | Grube et al. |
| 2011/0066595 A1 | 3/2011 | Kreuder et al. |
| 2011/0213879 A1 | 9/2011 | King et al. |
| 2012/0137094 A1 | 5/2012 | Gupta et al. |
| 2012/0203888 A1 | 8/2012 | Balakrishnan et al. |
| 2012/0214506 A1 | 8/2012 | Skaaksrud et al. |
| 2013/0007259 A1 | 1/2013 | Pacheco-Sanchez et al. |
| 2013/0166505 A1 | 6/2013 | Peretz et al. |
| 2013/0198368 A1 | 8/2013 | Patterson et al. |
| 2014/0317226 A1 | 10/2014 | Resch et al. |
| 2015/0381715 A1 | 12/2015 | Patterson et al. |
| 2017/0353535 A1 | 12/2017 | Patterson et al. |
| 2019/0141118 A1 | 5/2019 | Patterson et al. |
| 2021/0281635 A1 | 9/2021 | Patterson et al. |

LATENCY-BASED ROUTING AND LOAD BALANCING IN A NETWORK

CROSS REFERENCE TO RELATED PATENT APPLICATION

This application is a continuation of U.S. application Ser. No. 17/327,029, filed May 21, 2021, now U.S. Pat. No. 11,799,949, which is a continuation of U.S. application Ser. No. 16/241,683, filed Jan. 7, 2019, now U.S. Pat. No. 11,050,819, which is a continuation of U.S. application Ser. No. 15/466,583, filed Mar. 22, 2017, which is a continuation of U.S. application Ser. No. 14/755,731, filed Jun. 30, 2015, now U.S. Pat. No. 9,641,605, which is a continuation of U.S. application Ser. No. 13/363,996, filed Feb. 1, 2012, now U.S. Pat. No. 9,106,663, which are incorporated by reference herein in their entireties.

BACKGROUND

Architectures for administration of network systems become more complex as networks increase in size and functionality (e.g., available services, integration with subsystems and other networks, and the like). In addition to complexity, operational requirements for administration of such systems also tend to increase. In response, backend architectures commonly incorporate active/active replication topologies. Such topologies can comprise multiple master application footprints having, for example, asynchronous replication data between each master node in the active replication topology. Typically, the master nodes can convey (e.g., broadcast, unicast, or multicast) changes to other nodes in the active replication topology and can subscribe to receive changes that occur in other master nodes.

SUMMARY

The disclosure relates, in one aspect, to routing queries (e.g., content queries, service queries) to a network repository (e.g., a distributed content repository) and balancing load in a network having or being coupled to such repository. For a network repository (e.g., a data layer) having a plurality of content storage sites configured in a content replication topology, relative replication latency of content among each pair of content storage sites in the plurality of content storage sites can be monitored in accordance with various monitoring protocols, e.g., nearly continuous monitoring, periodic monitoring, scheduled monitoring, event-triggered monitoring, or the like. Such monitoring can update replication latency information at the content storage sites. Such sites can be referred to as nodes or end points and can comprise source nodes, which can supply content updates and related changes to a content replica, and target nodes, which can receive such content updates. Based at least in part on, for example, content updates, data indicative of replication latency can be distributed (e.g., broadcast, multicast, unicast, or the like) among the content storage sites and can be provided, for example, to a network node in a backend system layer, such as an application layer. Such data also can be persisted in a memory element (registers, memory pages, files, databases, etc.) of each content storage site in the data layer. To provide data indicative of replication latency among end points, each content storage site can implement control signaling, such as signaling beats, between all source nodes and target nodes (also referred to as subscribers) and can call a publisher node (also referred to as source) to inform (or update) replication latencies at respective targets.

In another aspect, the data indicative of relative replication latency can permit, at least in part, automated routing of queries (e.g., content queries) in response to performance conditions of a network node. In one scenario, for example, a traffic and control manager unit (e.g., a router or a load balancer) in the backend system layer can determine routing pathways for queries based at least in part on the relative replication latency data and performance conditions of network nodes in the backend system layer.

Some embodiments of the disclosure provide various advantages when compared to conventional technologies for routing traffic in an active replication topology. For example, some embodiments can provide routing criteria based at least on relative replication latency and performance conditions, and can permit automated determination of routing pathways for content queries and, more generally, traffic.

Additional aspects or advantages of the subject disclosure will be set forth in part in the description which follows, and in part will be obvious from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the subject disclosure.

DETAILED DESCRIPTION

Figure 1:
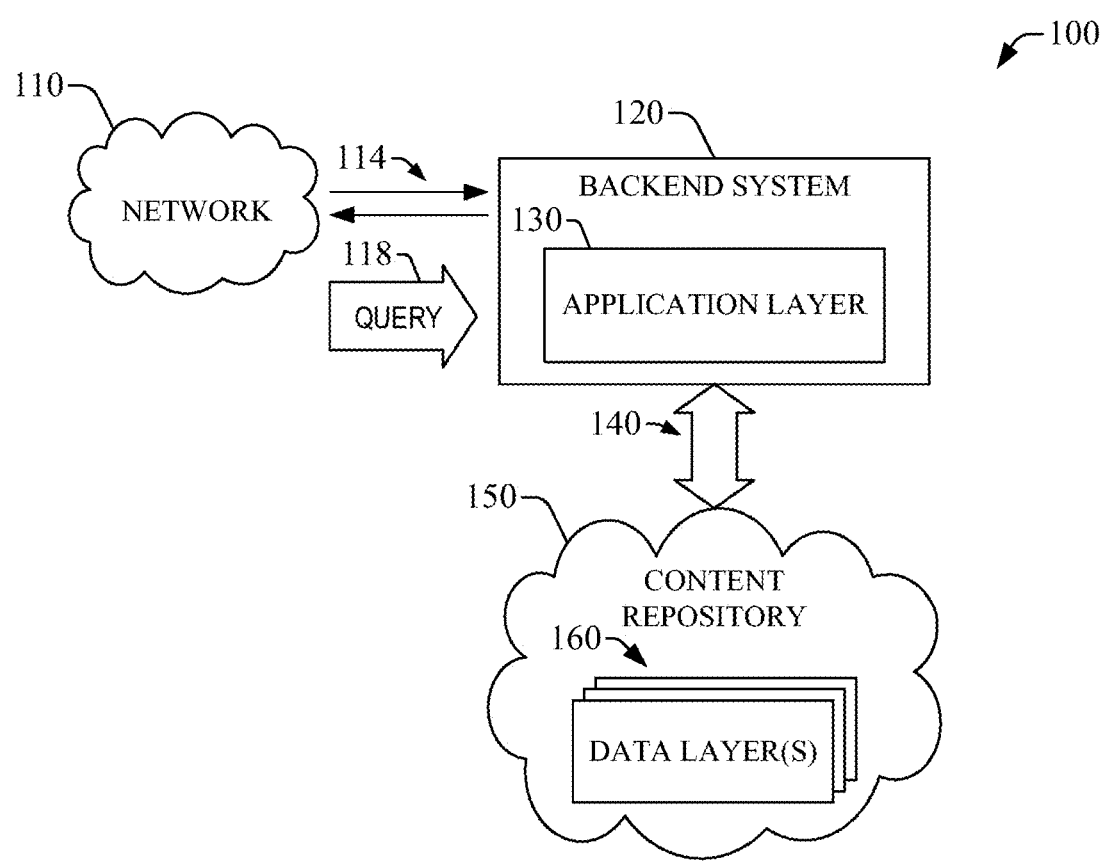
FIG. 1 illustrates an exemplary network environment in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for integrating information related to replication latency among network nodes into routing of queries (e.g., content queries, service queries) in an active replication topology of a distributed content repository. It is also to be understood that the terminology employed herein is for the purpose of describing particular, non-exclusive embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "layer," "component," "unit," "interface," "platform," "node," "function" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a system, a layer, a node, an interface, a function, a component, a platform, and the like. It is noted that in certain embodiments, or in connection with certain aspects or features such embodiments, the terms "system," "layer," "unit," "component," "interface," "platform" "node," "function" can be utilized interchangeably.

Throughout the description and claims of this specification, the words "comprise," "include," and "having" and their variations, such as "comprising" and "comprises," "include" and "including," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

The disclosure identifies and addresses, in one aspect, the lack of data replication latency associated with instantiation of content changes among network nodes in a replication topology, and implications of such lack of knowledge in routing of traffic and/or signaling to a distributed content repository. As described in greater detail below, in one aspect, the disclosure relates to routing queries (e.g., content queries, service queries) to a network repository (e.g., a distributed content repository) and balancing load in a network having or being coupled to such repository. For a network repository having a plurality of content storage sites configured in an active replication topology, relative replication latency of content (e.g., data and/or metadata) among each pair of content storages sites in the plurality of content storage sites can be monitored (nearly continuously, periodically, at scheduled instants, in response to an event, etc.). Data indicative of such replication latency can be distributed among the content storage sites and can be provided, for example, to a network node in a layer of a backend system, such as an application layer. A traffic and control manager unit (e.g., a router or a load balancer) in the layer of the backend system can determine routing pathways for queries based at least in part on the relative replication latency data and performance conditions of network nodes in the application layer. In addition or in the alternative, the traffic and control manager unit can balance load (e.g., volume of queries) of a network node based on performance condition of such node. Certain functional elements of the subject disclosure can be implemented (e.g., performed) by software, hardware, or a combination of software and hardware. Functional elements of the various embodiments described in the present specification and illustrated in the annexed drawings can be employed in operational environments (access network, telecommunication network, signaling network, etc.) that can include, for example, digital equipment, analog equipment, or both, wired or wireless equipment, etc.

FIG. 1 is a high-level block diagram of an exemplary network environment 100 in accordance with one or more aspects of the disclosure. As illustrated, the exemplary network environment 100 comprises a network 110 functionally coupled (e.g., communicatively coupled via wired links or wireless links, or a combination thereof) to a backend system 120. In certain embodiments, the network 110 can be a service network. Such coupling permits, at least in part, the network 110 to provide a service. A data and signaling pipe 114 comprising an upstream link, or uplink (UL), and a downstream link, or downlink (DL), enables functional coupling among the backend system 120 and the network 110. The UL is represented with an arrow oriented outwards from the network 110, whereas the DL is represented with an arrow oriented towards the network 110. The data and signaling pipe 114 can comprise one or more of: a reference link (Cx, Cr, Dh, Dx, Gm, Ma, Mg, or the like) and related components; conventional bus architectures such as address buses, system buses; wired links, such as fiber optic lines, coaxial lines, hybrid fiber-coaxial links, Ethernet lines, T-carrier lines, twisted-pair line, or the like, and various connectors (e.g., an Ethernet connector, an F connector, an RS-232 connector, or the like); wireless links, including terrestrial wireless links, satellite-based wireless links, or a combination thereof; and so forth.

The network 110 can include wireless networks, wire line networks, or a combination thereof, and can provide a service to one or more devices, such as user equipment, customer premises equipment, control equipment (e.g., signaling units), operation and maintenance (O&M) equipment (e.g., network probes), and the like. In one aspect, the service provided by the network 110 can be a consumer service, such as content communication (media on demand, Internet service, digital telephony (e.g., voice over internet protocol (VoIP)), multimedia message service (MMS), short message service (SMS), etc.); content management (e.g., network digital video recording, messaging administration); emergency services (e.g., enhanced 911); location-based services; or the like. In another aspect, the service provided by the network 110 can be a network administration service, which can comprise one or more of accounting and billing, access control, subscriber provisioning, customer service support (including, for example, interactive voice response (IVR)), performance monitoring (e.g., dashboard services, automation control, etc.), or the like. Architecture of the network 110 can be specific to the provided service.

The network 110 can embody or comprise one or more of a wide area network (WAN), a signaling network (e.g., SS #7), an enterprise network, a local area network, a home area network, a personal area network (which can include wearable devices), or the like. Such networks can operate in accordance with one or more communication protocols for wire line communication or wireless communication. In certain embodiments, the network 110 can have several functional elements that can provide a backbone network, such as a high-capacity packet-switched network. In other embodiments, the network 110 can have internal structure, with several functional elements that can provide at least two main operational blocks: a backbone network (e.g., a high-capacity packet-switched network) and a regional access network (RAN). The internal structure also can include functional elements that provide more spatially localized networks, such as local area networks, home area networks, or the like. Both the backbone network and the regional access network (RAN) can be WANs, for example, with the backbone network having a larger geographical scope than the RAN.

Figure 2:
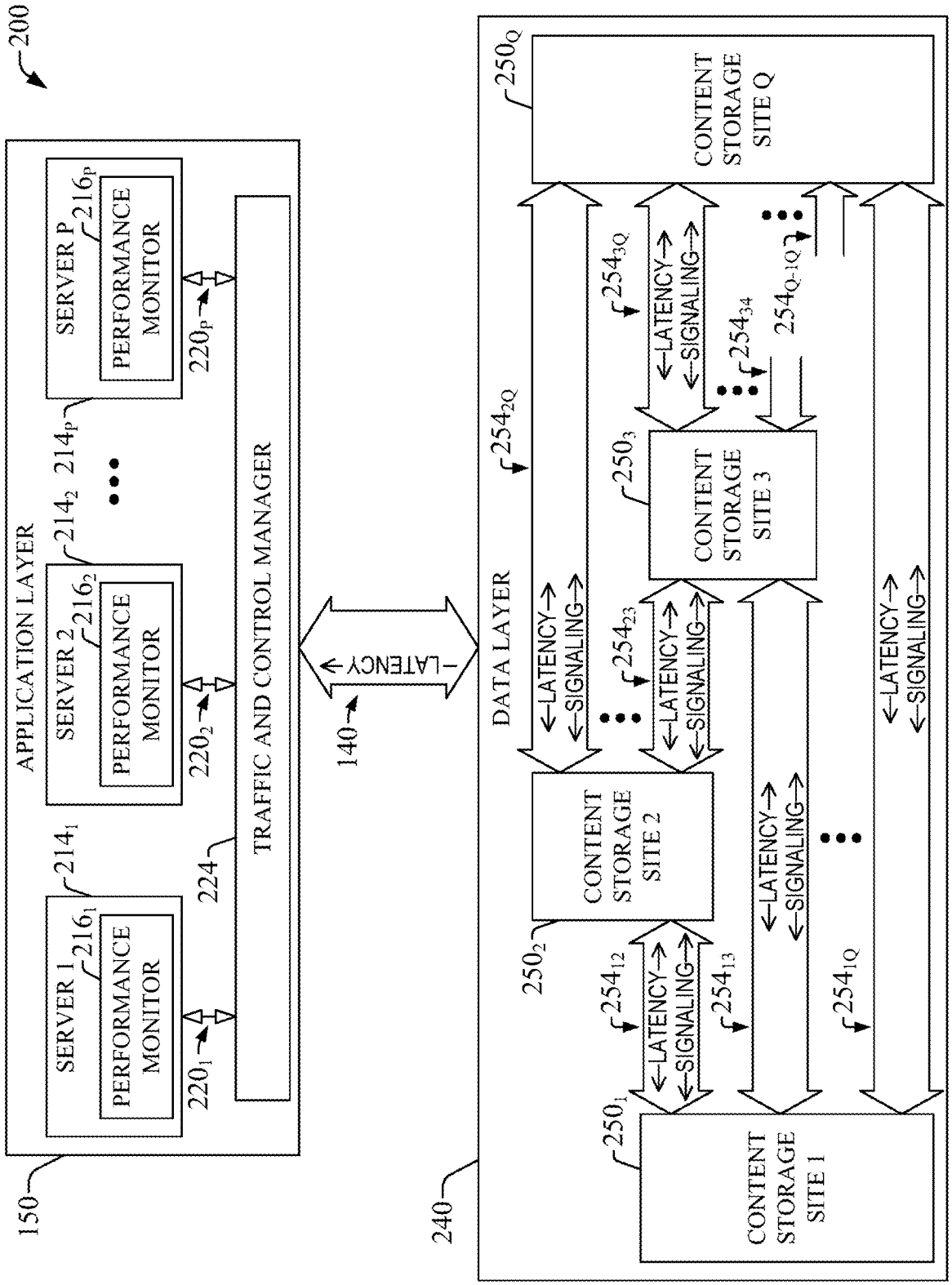
FIG. 2 illustrates an exemplary embodiment of a multi-layer network system in accordance with one or more aspects described herein.

The backend system 120 can comprise an application layer 130 which can provide specific functionality associated with a service (consumer service, enterprise service, network administration, etc.) of the network 110. The application layer 130 can be configured as a single logical unit and can comprise one or more application servers that can implement (e.g., execute) such functionality. An application server can be, for example, a content server for pay-per-view programming or video-on-demand assets, an application server (e.g., an email server), a data server, a telephony server, a backbone network router, or the like. In network management scenarios, an application server can comprise an access request manager server, a provisioning server, an accounting server, and a billing record collector server. In one embodiment, the access request manager server can comprise an authentication, authorization, and account (AAA) server, which can implement one or more access protocols (Kerberos, RADIUS, Diameter, lightweight directory access protocol (LDAP), etc.), and access control unit (or access controller); the provisioning server can be a dynamic host configuration protocol (DHCP) engine; and the billing record collector server can be an IP detail record (IPDR) collector server. In addition or in the alternative, the application layer 130 can comprise one or more network nodes, such as utility servers, routers (e.g., broadband remote access server (BRAS)), or network switches (e.g., digital subscriber line access multiplexer (DSLAM)), that can provide utility functions to the application layer 130. As an illustration, a utility server can be a web server that can permit, at least in part, access to web services and to communication based on various web-based communication protocols, such as hypertext transfer protocol (HTTP), simple object access protocol (SOAP), or simple network management protocol (SNMP). In one embodiment, e.g., exemplary embodiment 200 shown in FIG. 2, the application layer 130 can include P servers $214_1$-$214_P$, with P a natural number equal to or greater than unity, and a traffic and control manager unit 224 (also referred to as traffic and control manager 224). Functionality and architecture of each one of servers $214_1$-$214_P$ can be specific to the embodiment of the backend system 120. At least one server (e.g., one, a combination of two, or a combination of more than two) of the servers $214_1$-$214_P$ can be functionally coupled to a traffic and control (T&C) manager unit 224 (also referred to herein as T&C manager 224). Each one of the servers $214_1$-$214_P$ can be coupled can be functionally coupled to the T&C manager 224 via a respective data and signaling pipe $220_\kappa$. Here, κ is an index that adopts values from 1 to P at intervals of 1, e.g., κ=1, 2 . . . P. Each one of the data and signaling pipes $220_1$-$220_P$ can include one or more of wireless links, wire line links, or a combination thereof. Each of such data and signaling pipes can comprise one or more of: a reference link (Cx, Cr, Dh, Dx, Gm, Ma, Mg, or the like) and related components; conventional bus architectures such as address buses, system buses; wired links, such as fiber optic lines, coaxial lines, hybrid fiber-coaxial links, Ethernet lines, T-carrier lines, twisted-pair line, or the like, and various connectors (e.g., Ethernet connectors, F connectors, RS-232 connectors, or the like); wireless links, including terrestrial wireless links, satellite-based wireless links, or a combination thereof and so forth.

The application layer 130 can receive a query 118 from the network 110 or a component thereof. Such network can transmit the query 118 as part of providing a service. In one aspect, a traffic and control manager 224 can receive the query 118. In one aspect, the query 118 can request content (data, metadata, etc.) specific to the service. In addition or in the alternative, the query 118 can request an update of specific data related to the service. The application layer 130, via the traffic and control manager 224, for example, can process the query 118. As part of the processing, in one aspect, the application layer 130 can generate an updated query. The traffic and control manager 224 can determine a pathway for routing the query 118 or the processed query to a content repository 150 in which a functional element (e.g., a database manager unit) can process the query 118 or the updated query, or both, and can generate a response. In addition or in the alternative, the traffic and control manager 224 can balance load (e.g., volume of queries) of a server of the one or more servers $214_1$-$214_P$ based at least on performance condition(s) of the server.

As illustrated in exemplary environment 100, the content repository 150 can comprise a group of one or more data layers 160. Each data layer can be configured as a single logical unit having a plurality of content storage sites that can have content (data, metadata, etc.) suitable for generating a response to the query 118 or the processed query. In one embodiment, e.g., embodiment 200, a data layer 240 of the group of one or more data layers 160 can comprise a plurality of content storage sites $250_1$-$250_Q$, with Q a natural number greater than unity. In one aspect, each content storage site $250_\nu$ can be functionally coupled to the other Q–1 content storage sites $250_\mu$, via a data and signaling pipe $254_{\nu,\mu}$, which is identified with a pair of indices that represent the coupled content storage sites. Here, $\nu$ and $\mu$ are indices that each adopts values from 1 to Q at intervals of 1, e.g., $\nu$=1, 2 . . . Q and $\mu$=1, 2 . . . Q, with the condition of $\mu \neq \nu$. In response to the query 118, a content storage site (e.g., content storage site $250_2$) in a data layer (e.g., data layer 240) in the group of one or more layers 160 can transmit content (e.g., data or metadata) to the application layer 130 which can relay such content to the network 110. In one scenario, the content storage site can transmit the content to a functional element (e.g., a server) of the application layer 130 originating the query or processed query. In another scenario, the content can be transmitted to two or more functional elements (e.g., a gateway and a server) in the application layer 130, the two or more functional elements can include the functional element originating the query or the processed query.

Communication among a data layer of the one or more data layers 160 and the application layer 130 can be accomplished, at least in part, via data and signaling pipe 140. In one aspect, such communication can be effected in accordance with one or more packet-switched protocols, such as Ethernet protocol format; internet protocol (IP) format, such as IPv4 and IPv6, or the like; TCP/IP; user datagram protocol (UDP) format, HTTP, simple object access protocol (SOAP), simple network management protocol (SNMP), or the like. Similarly to other data and signaling pipes described herein, the data and signaling pipe 140 can comprise one or more of: a reference link and related components (routers, switches, gateways, interfaces, ports, connectors, etc.); conventional bus architectures, such as address buses or system buses; wired links, such as fiber optic lines, coaxial lines, hybrid fiber-coaxial links, Ethernet lines, T-carrier lines, twisted-pair line, or the like, and various connectors (e.g., Ethernet connectors, F connectors, RS-232 connectors, or the like); wireless links, including terrestrial wireless links, satellite-based wireless links, or a combination thereof; and so forth.

Figure 3:
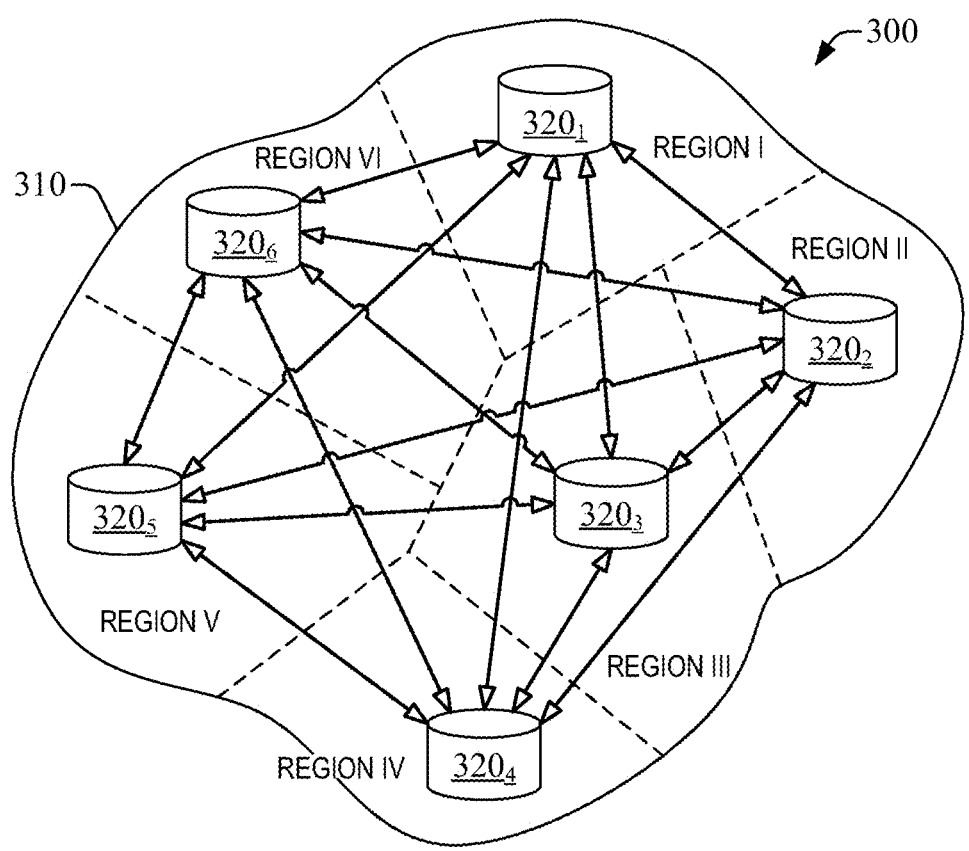
FIG. 3 illustrates an exemplary configuration of content storage in accordance with one or more aspects of the disclosure.

A server in the application layer 130 can be associated with a set of one or more content storage sites that can supply data in response to requests from the server. In certain scenarios, the association among the server and the set of one or more content storage sites (e.g., $250_1$-$250_Q$) can be based on geopolitical considerations, wherein the server can be assigned to a single content storage site servicing most application servers deployed within a specific region. As illustrated in FIG. 3, in an exemplary deployment 300 of a data layer, a plurality of content storage sites $320_1$-$320_6$ can be distributed in certain geopolitical area 310. Such content storage sites are functionally coupled through data and signaling pipes represented with open-head arrows, to pictorially indicate that one or more network components (router(s), server(s), network switches(s), connector(s), hubs, etc.) can permit communication among the sites. Each one of the plurality of content storage sites can be deployed in a location within the geopolitical area 310 and can service queries (e.g., generate a response to such queries) originating from network elements of the network 110 in a specific region (e.g., Region I, Region II, Region III, Region IV, Region V, or Region VI) of the geographical area 310. While six content storage sites $310_1$-$310_6$ are illustrated within the geographical (or geopolitical) area 310, other deployments are possible and contemplated in the subject disclosure. In one aspect, a data layer can include content storage sites having content of certain type. As an example, the content can comprise billing records and other billing data, and the data layer can be a billing data layer. As another example, the content can comprise safety records, and the data layer can be safety data layer compliant with one or more regulation such as the Communications Assistance for Law Enforcement Act (CALEA). As yet another example, the content can comprise records of certain type of subscribers, such as members of a loyalty program or a premium service, and the data layer can be a provisioning data layer. In another aspect, a data layer can include content storage sites associated with a specific tier in a hierarchical data structure. In yet another aspect, a data layer can include content storage sites having data specific to certain functional features of the service provided by the network 110. For instance, if the network 110 is an industrial automation network, the content storage sites can comprise data pertaining to a plurality of programmable logic controller deployed in such network.

In exemplary embodiment 200, to generate a routing pathway of the query 118, the T&C manager 224 can probe a performance condition of at least one server (e.g., one, each one, two, more than two . . . ) of the group of one or more servers $214_1$-$214_P$, wherein the performance condition indicates a level of performance to service the query 118. Likewise, to balance load of a server, the T&C manager 224 probe the performance condition(s) of the server. The performance condition can be characterized by an indicator in a scale of performance conditions. For example, such scale can be have tiers such as "Satisfactory," indicating a server is capable of properly servicing the query 118; "At Risk," indicating a server may be unable to properly service the query 118; and "Underperforming," indicating a server is unable to service the query 118. Other scales, finer or coarser, also can be defined and utilized. The routing pathway can include information (e.g., a logical address) indicative of a destination content storage site (e.g., content storage site 3 $250_3$) suitable to service the query 118, and information (e.g., a plurality of logical addresses) indicative of a sequence of functional elements, or hops, of data and signaling pipe 140 that can be utilized to transmit the query 118 from an originating server in the data layer 150 to the destination content storage site.

In one aspect, a server $214_K$ can include a performance monitor component $216_K$ (also referred to as performance monitor $216_K$) that can generate a performance metric indicative of a volume of extant queries directed to the server $214_K$. In one implementation, to generate the performance metric, the performance monitor $216_\mu$ can access (e.g., pull) information indicative of idle thread counts, memory utilization, and the like, and assign such information to be the performance metric. In another implementation, the performance monitor $216_\mu$ can determine, based on information retained in a container for a Java Virtual Machine, for example, a number of timed-out queries or a number of queued queries (e.g., queries transmitted for service to a server), or a combination thereof, and can assign the performance metric to one of the determined quantities. The performance monitor component $216_K$ can publish, or otherwise convey, an object identifier (e.g., a SNMP OD) that can point to, or convey an address of, a data structure comprising the performance metric. The object identifier that is published or conveyed can be accessed by a functional element (a server, a router, a unit, etc.) in the network 110 to monitor performance of the backend system 120. In the exemplary system 200, the T&C manager 224 can be part of a network operation center (NOC) that is part of or is functionally coupled to one or more of operational support systems (OSS) or business support systems (BSS). In one embodiment, the T&C manager 224 can comprise or be embodied in a router. In another embodiment, the T&C manager 224 can comprise or be embodied in a load balancer. In other embodiments, the T&C manager 224 can comprise or be embodied in a router and a load balancer.

By probing a performance condition, the T&C manager 224 can access (e.g., receive or retrieve) a performance metric associated with the performance condition of a server that is probed. The T&C manager 224 can configure automatically a specific content storage site to service the query 118 in response to the performance metric fulfilling a specific performance criterion, such as the performance metric having a predetermined value (e.g., attaining a lower bound). Accordingly, the T&C manager 224 can balance load in the application layer 150 in response to the performance condition, or state, of each one of the servers 214₁-214_P. Performance criteria (or performance rules) can be configurable by an administrator (e.g., an owner, a lessee, or a lessor) of the backend system 120.

In exemplary embodiment 200, data layer 240 can be configured in an active replication topology wherein content (e.g., data and/or metadata) retained in a content storage site 250_μ is replicated to each of the remaining content storage sites {250_μ'}, with $\mu'=1, 2 \ldots Q$ and $\mu'\neq\mu$. In one aspect, replication of data can result in replication latency $T_{\nu\mu}$, or relative lag time of content storage site 250_μ (a target node) to instantiate a content update performed at content storage site 250_ν (e.g., a source node). Accordingly, for each content storage site 250_ν in data layer 240, a plurality of replication latencies $\{T_{\nu\nu'}\}$, with $\nu'=1, 2 \ldots Q$ and $\nu'\neq\nu$, can be established. It should be appreciated that $T_{\nu\mu}$ can be different from $T_{\mu\nu}$ because the relative lag of content storage site 250_μ □ (as a target node □) to apply (at content storage site 250_μ) a content update effected at content storage site 250_ν (as a source node □) can be different from the relative lag of content storage site 250_ν (as a target node □) to apply (at content storage site 250_μ) a content update effected at content storage site 250_μ (as a source node □). In certain scenarios, replication latency can range from the order of few seconds to the order of tens of minutes (e.g., 22 minutes, 35 minutes). In such active configuration, each content storage site can be referred to as a target node for service of a content query (e.g., query 118). As illustrated, in view of such symmetry for a replication latency, each content storage site 250_γ, with $\gamma=1, 2 \ldots Q$, can transmit, via data and signaling pipe 254_γν, data indicative of latency $T_{\gamma\nu}$ to each content storage site 250_ν, with $\nu\neq\gamma$. In addition, each content storage site 250_γ, with $\gamma=1, 2 \ldots Q$, can receive data indicative of latency $T_{\gamma\nu}$ from other content storage site 250_ν, with $\nu\neq\gamma$. Accordingly, in one aspect, each content storage site γ can compose a data structure containing data indicative of the relative lag time for instantiation of specific content with respect to other content storage site 250_γ. In one implementation, the data structure can be a two-dimensional matrix $\vec{T}$ of real numbers:

$$\vec{T} = \begin{bmatrix} 0 & T_{12} & T_{13} & \cdots & T_{1\gamma} \\ T_{21} & 0 & T_{23} & \cdots & T_{2\gamma} \\ T_{31} & T_{32} & 0 & \cdots & T_{3\gamma} \\ \vdots & \vdots & \vdots & 0 & \vdots \\ T_{\gamma 1} & T_{\gamma 2} & T_{3\gamma} & \cdots & 0 \end{bmatrix}.$$

Figure 4:
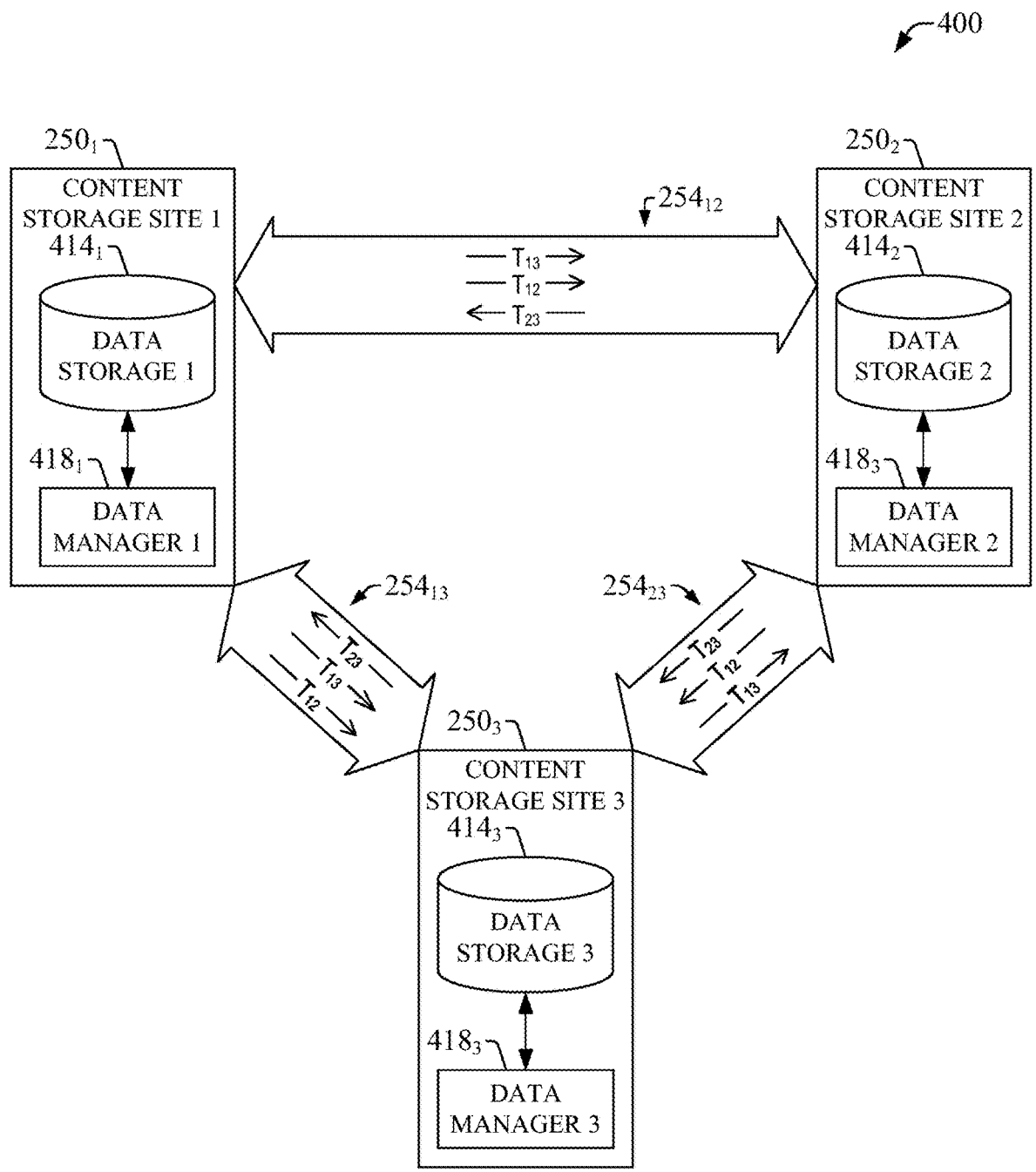
FIG. 4 illustrates exemplary embodiments of content storage and exemplary configuration thereof in accordance with one or more aspects of the disclosure.

FIG. 4 illustrates an exemplary embodiment 400 in which Q=3, wherein content storage sites 250₁, content storage site 250₂, and content storage site 250₃ exchange, via data and signaling pipes 254_{12}, 254_{23}, and 254_{13}, data indicative of replication latency $T_{\alpha\beta}$, with $\alpha,\beta=1, 2, 3$, and $\beta>\alpha$. In an aspect, content storage site 250₁ can receive data indicative of the replication latency $T_{23}$ among content storage sites 250₂ and 250₃. In another aspect, content storage site 250₂ can receive data indicative of the replication latency $T_{13}$ among content storage sites 250₁ and 250₃. In yet another aspect, content storage site 250₃ can receive data indicative of the replication latency $T_{12}$ among content storage sites 250₁ and 250₂. In another aspect, content storage site 250₁ can transmit (e.g., broadcast), to content storage sites 250₂ and 250₃, data indicative of the replication latency of such site with respect to each of content storage sites 250₂ and 250₃—e.g., content storage site 250₁ can transmit data indicative of $T_{12}$ and $T_{13}$ to content storage site 250₂ and 250₃. As an illustration, each content storage site 250_α can retain the following matrix t of replication latencies:

$$\vec{t} = \begin{bmatrix} 0 & T_{12} & T_{13} \\ T_{21} & 0 & T_{23} \\ T_{31} & T_{32} & 0 \end{bmatrix}.$$

As illustrated in FIG. 4 for Q=3, a content storage site 250_κ can comprise a data manager unit κ 418_κ (also referred to as a data manager 418_κ) which can have more components, and a data storage κ 224_κ that can include a plurality of data storage elements. In one aspect, data storage κ 224_κ can be configured (e.g., installed, tested, and accepted) in a mated pair configuration to provide redundancy and thus increase resilience to malfunction or other issues that might impact negatively the performance of the content storage site 250_κ. The data manager 418_κ can transmit and receive data indicative of replication latency in accordance with aspects described herein. In addition or in the alternative, the data manager 418_κ can generate a data structure having at least a portion of the received data indicative of replication latency. For instance, the data manager 418_κ can compose a symmetric two-dimensional matrix (e.g., $\vec{T}$) having a rank equal to Q. The data manager 418_κ can retain the data structure can be retained in the data storage κ 224_κ.

A content storage site 250_κ can acquire data indicative of replication latency $T_{\kappa\kappa'}$, with $\kappa'=1, 2 \ldots Q$ and $\kappa'\neq\kappa$, according to various modalities. In one modality, the content storage site 250_κ, via data manager 418_κ, for example, can transmit a signaling beat to each content storage site 250_κ', in the replication topology of data layer 240. The signaling beat can be a periodic control signal, such as a lightweight (e.g., 1-3 bit) control packet. Control signaling other than a signaling beat also can be utilized. In response to the signaling beat, the content storage site 250_κ can receive data indicative of $T_{\kappa\kappa'}$ from at least one content storage site 250_κ', in the plurality of content storage sites 250₁-250_Q. Upon or after such data is received, the content storage site 250_κ can compose a data structure having the data indicative of $T_{\kappa\kappa'}$ for content storage sites that supplied replication latency data in response to the signaling beat. In another modality, the content storage site $250_K$ can subscribe to a utility application (e.g., a demon) executed by one or more content storage sites of the plurality of content storage sites $250_1$-$250_Q$, the utility application transmitting data indicative of replication latency among the content storage site executing the application and the content storage site $250_K$ in response to an updated (e.g., new) replication latency being determined for specific content. In yet another modality, which can be referred to as a push modality, the content storage site $250_K$ can transmit data indicative of replication latency $T_{KK'}$ at predetermined instants (e.g., periodically with period τ, or according to a schedule) to one or more (e.g., each one) of the plurality of content storage sites $250_1$-$250_Q$.

Replication latency can be determined in response to specific content (e.g., data or metadata) being instantiated in the content store sites $250_1$-$250_Q$ in the data layer 240. As described herein, the content store sites $250_1$-$250_Q$ can be configured in an active replication topology. Accordingly, content that is retained in the data layer 240 is propagated (e.g., transmitted) via data and signaling pipes $254_{v\mu}$ (with v,µ=1, 2 ... Q) among content storage sites $250_1$-$250_Q$. A modality of content propagation can include a publisher-subscriber approach in which each content storage site $250_v$ of the content storage sites $250_1$-$250_Q$ can transmit (e.g., publish) content change vectors (or data structures indicative of content change(s)) to the other content storage site $250_\mu$, with µ=1, 2 ... Q. In addition, each content storage site $250_v$ of the content storage sites $250_1$-$250_Q$ can subscribe to receive content change vectors from other content storage sites. In one aspect, when content is instantiated in a content storage site $250_K$, signaling can be transmitted to each content storage site $250_{K'}$ in the plurality of content storage sites $250_1$-$250_Q$. The content storage site can transmit the signaling, which can comprise control instructions, control packets, clock signals, or the like. In one aspect, content instantiation can refer to memory allocation for the content and the content and retention (e.g., persistence) of the content in the allocated memory. In certain embodiments, the content can be instantiated in a data storage $414_K$, and a data manager $414_K$ can generate and transmit the signaling. In response to transmission of the signaling, the content storage site $250_K$ can trigger a timer (or a clock or any type of counter) $\tau_{KK'}$ for each content storage site $250_{K'}$. In addition or in the alternative, the signaling (e.g., a control instruction) can instruct each of the content storage sites $250_K$, in the plurality of content storage sites $250_1$-$250_Q$ to transmit an acknowledgement (ACK) signal to the content storage site $250_K$ after or when the content has been instantiated in the content storage site $250_{K'}$. In response to reception of an ACK signal from a content storage site $250_K'$, the content storage site $250_K$ can receive can stop a respective timer $\tau_{KK'}$. The value of the timer can indicate the replication latency $T_{KK''}$.

In connection with generation of a routing pathway, to configure automatically a specific content storage site $250_v$ for servicing the query 118 in response to a performance condition of a server $214_K$ in the application layer 150, T&C manager 224 can acquire (receive, retrieve, or otherwise access) and utilize data indicative of replication latency for specific content at the content storage sites $250_1$-$250_Q$. The specific content can be substantially common to each one of the content storage sites (or target nodes) $250_1$-$250_Q$. The T&C manager 224 can acquire the data indicative of replication latency via, at least in part, data and signaling pipe 230. In one implementation, T&C manager 224 can poll, via data and signaling pipe 230, each of the content storage sites $250_1$-$250_Q$ for a data structure having data indicative of the plurality of relative lag times for instantiation of the specific content. The T&C manager 224 can poll each of the content storage sites $250_1$-$250_Q$ in nearly real time or at scheduled instants. In addition or in the alternative, the T&C manager 224 can poll each of the content storage sites $250_1$-$250_Q$ in response to a predetermined event. In addition or in the alternative, the T&C manager 224 can configure automatically a destination node (e.g., a server) for queries (e.g., service queries, content queries, or the like) in accordance with one or more predetermined criteria for performance of the destination node, such as a server of the one or more servers $214_1$-$214_P$. In one scenario, the T&C manager 224 can automatically decommission a server in response to the server having a performance condition (e.g., "At Risk") indicating that server may be approaching an operation state in which servicing queries no longer is possible or efficient. The T&C manager 224 can automatically re-commission a decommissioned server in response to such server recovering an operation state having a performance condition (e.g., "Satisfactory") indicating that the decommissioned server can be service queries (e.g., content queries, service queries, or the like).

In one latency-based routing scenario in exemplary embodiment 200, after replication latency data is acquired, the T&C manager 224 can monitor data indicative of performance to service a query for specific content (or a content query) for each server of the plurality of servers $214_1$-$214_P$ in application layer 150. In one implementation, as part of the monitoring, the T&C manager 224 can compare such data with a service performance criterion (e.g., one or more thresholds for a key performance indicator (KPI)). In response to such performance failing to fulfill a criterion for acceptable performance (e.g., performance is below a threshold) for at least one server (e.g., server $214_2$) of the plurality of servers $214_1$-$214_P$ in application layer 150, the T&C manager 224 can select an alternative server (e.g., server $214_{P-1}$) of such plurality to service the content query (e.g., query 118) based at least on replication latency of a content storage site associated with the alternative server with respect to at least one content storage site of the plurality of content storage sites $250_1$-$250_Q$ in data layer 240. As an example, the T&C manager 224 can select the alternative server having an associated content storage site with the lowest replication latency with respect to a content storage site associated with an underperforming server, e.g., a server having a performance condition that fails to meet a criterion for acceptable performance. More complex routing criteria can be employed. In one aspect, the T&C manager 224 can select an alternative server based on replication latency of a content storage site associated therewith and performance condition of the alternative server. An alternative server having a content storage site with low replication latency with respect to a content storage site associated with the underperforming server may not be selected when the performance condition of the alternative server is "At Risk" for underperformance. In such scenario, the T&C manager 224 can identify another alternative server suitable for servicing a query initially directed to an underperforming server.

Figure 5:
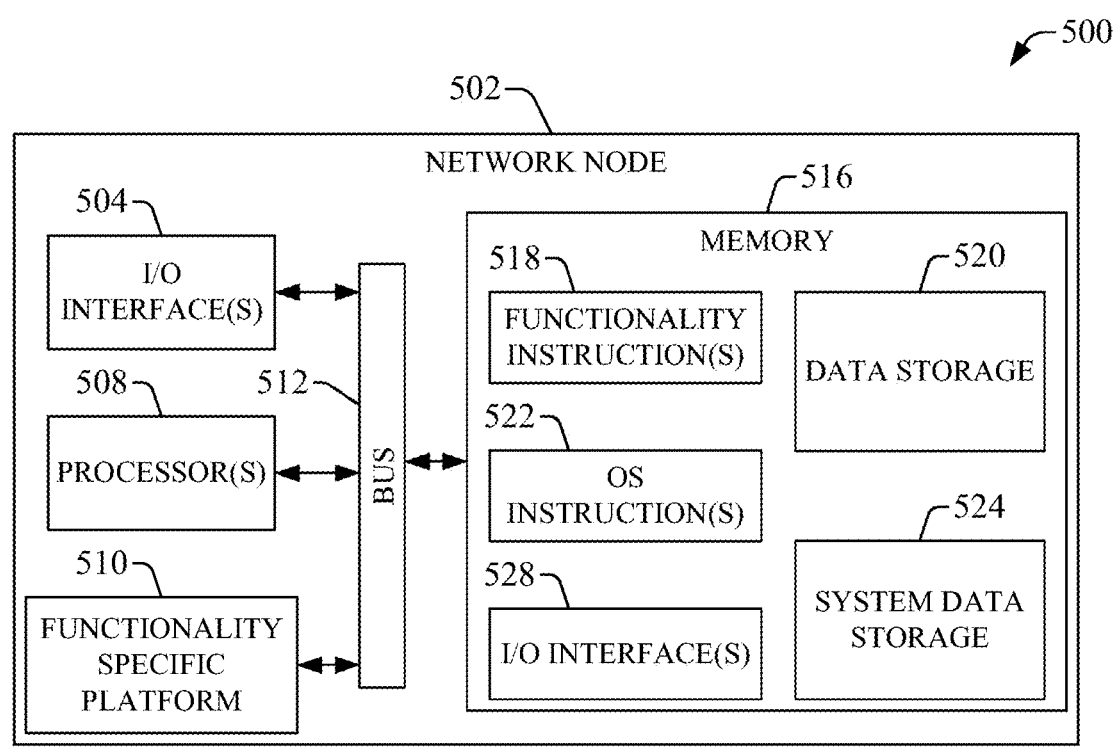
FIG. 5 illustrates an exemplary network node in accordance with one or more aspects of the disclosure.
Figure 6:
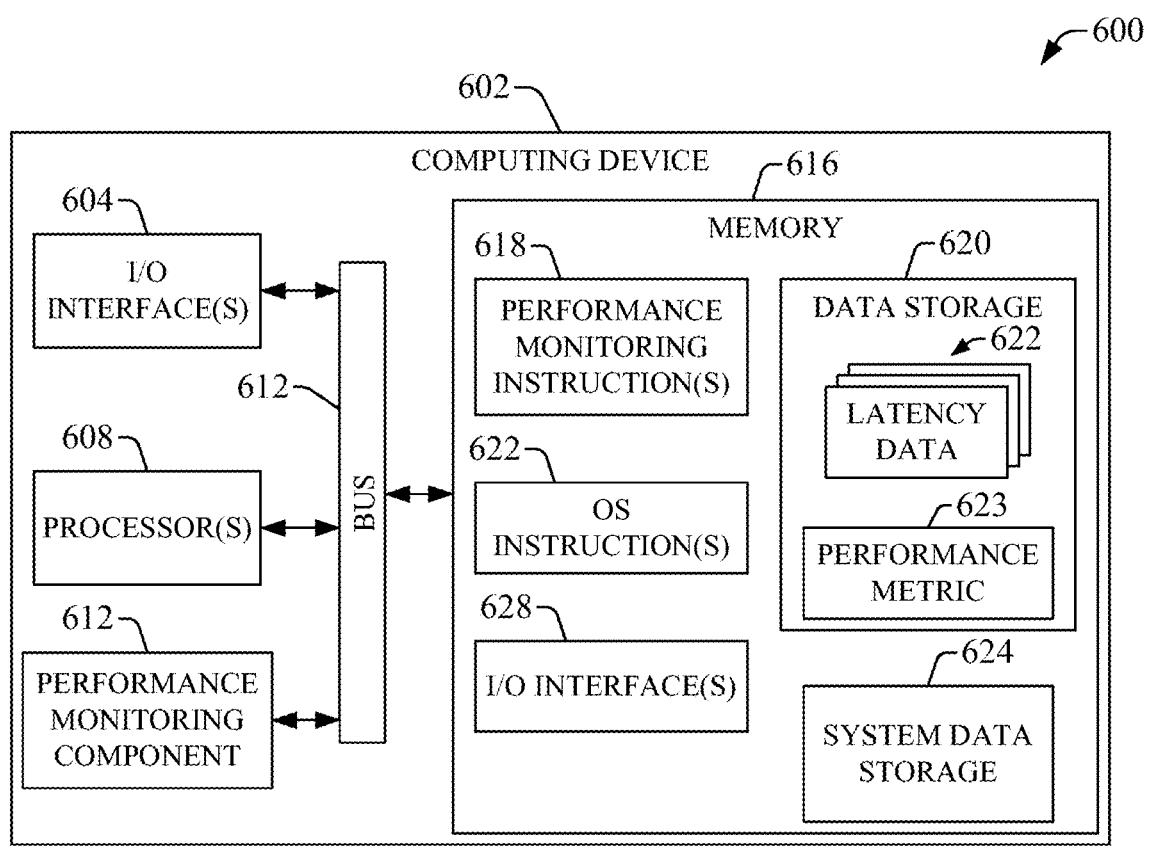
FIG. 6 illustrates an exemplary computing device in accordance with one or more aspects of the disclosure.

FIG. 5 is a block diagram of an exemplary embodiment 500 of a network node 502 in accordance with one or more aspects of the disclosure. The network node 502 is an apparatus that can embody a functional element of application layer 130 and a data layer of the one or more data layers 160. For example, network node 502 can embody a server of the one or more servers $214_1$-$214_P$, or a data manager unit (e.g., data manager 418₁) that can be part of a content storage site. An exemplary embodiment of a server is illustrated with a computing device 602 shown in FIG. 6. In the illustrated embodiment, the network node 502 comprises a group of one or more I/O interfaces 504, a group of one or more processors 508, a memory 516, and a bus 512 that functionally couples (e.g., communicatively couples) two or more of the functional elements of the network node 502 including the group of one or more processors 508 to the memory 516. In scenarios in which operation of network node 502 can be critical to network performance (e.g., performance of application layer 130), such as in security-sensitive applications (e.g., banking services), the group of one or more processors 508 can comprise a plurality of processors that can exploit concurrent computing.

Functionality of network node 502 can be configured by a group of computer-executable instructions (e.g., programming code instructions or programming modules) that can be executed by at least one processor of the one or more processors 508. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the at least one processor. For example, a first group of computer-executable instructions can configure logic that, in response to execution by the at least one processor, can enable the network node 502 to operate as a server (an application server, a provisioning server, an AAA server, a proxy server, a communication management server, etc.), a gateway node (a session border controller (SBC), a media gateway control function ((MGCF), etc.), or a data manager unit which can be part of a data layer, such as a data layer of the one or more data layers 160.

Data and computer-accessible instructions, e.g., computer-readable instructions and computer-executable instructions, associated with specific functionality of the network node 502 can be retained in memory 516. Such data and instructions can permit implementation, at least in part, of the latency-based routing, and related load balancing, of queries in accordance with one or more aspects of the disclosure. In one aspect, the computer-accessible instructions can embody any number of programming code instructions or program modules that permit specific functionality. In the subject specification and annexed drawings, memory elements are illustrated as discrete blocks, however, such memory elements and related computer-accessible instructions (e.g., computer-readable and computer-executable instructions), and data can reside at various times in different storage elements (registers, memory pages, files, databases, memory addresses, etc.; not shown) in memory 516.

Figure 7:
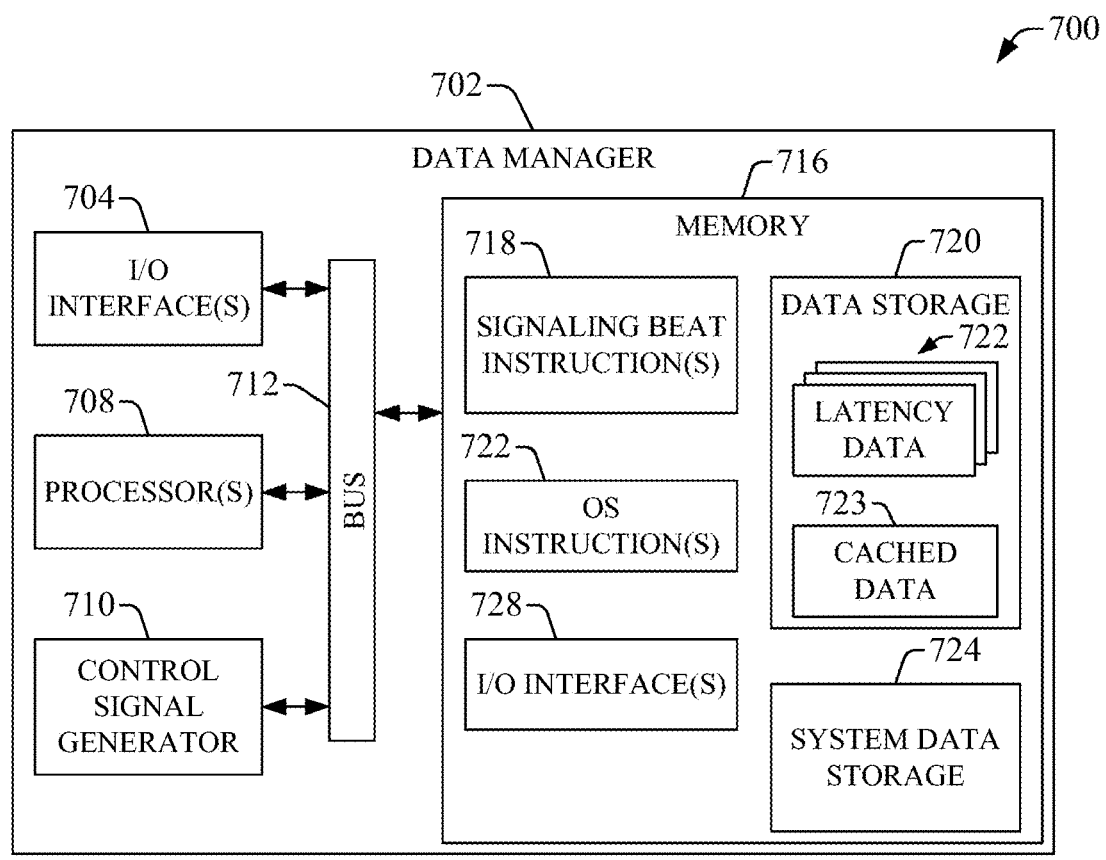
FIG. 7 illustrates an exemplary data manager in accordance with one or more aspects of the disclosure.

Data storage 520 can comprise a variety of data, metadata, or both, associated with latency-based routing, and relating load balancing, in accordance with aspects described herein. As an illustration, in a configuration in which the network node 510 can embody a server (such as computing device 602 shown in FIG. 6), such server can include data storage (e.g., data storage 620) having data indicative of replication latency among a content storage site associated with the server and other content storage sites in a data layer (e.g., data layer 240). At the server, such data can be retained, for example, in a memory element, referred to as latency data 622. In addition, such data (e.g., computing device 602) also can include data indicative of performance metric(s) of one or more servers or data, such as a SNMP OID, that can reference a memory element in data storage 620 having data indicative of performance metric(s) of one or more servers. As an example, a memory element referred to as performance metric 623 can contain such data. As another illustration, in a configuration in which the network node 150 can embody a data manager unit (e.g., data manager 702 shown in FIG. 7), such data manager unit can include data storage (e.g., data storage 720) having data indicative of replication latency of a content storage site comprising the data manager 702 and other content storage sites in a data layer (e.g., data layer 240). The data storage in the data manager unit (e.g., data manager 702) also can include data indicative of timer values for instantiation of content at various content storage sites. For example, such data associated with timer values can be retained in a memory element, referred to as cached data 723.

Memory 516 also can comprise one or more computer-executable instruction(s) for implementation of specific functionality of the network node 502 in connection with the dynamic provisioning of communication resources described herein. Such computer-executable instructions can be retained as a memory element labeled functionality instruction(s) 518. In one aspect, as described herein, functionality instruction(s) 518 can be stored as an implementation (e.g., a compiled instance) of one or more computer-executable instructions that implement and thus provide at least the functionality of the methods described herein. Functionality instruction(s) 518 also can be transmitted across some form of computer readable media. It should be appreciate that different functionality instruction(s) can render physically alike network nodes into functionally different components (e.g., a server and a data manager unit), with functional differences dictated by logic (e.g., computer-executable instructions and data) specific to each one of such network nodes and defined by the functionality instruction(s) 518. In an exemplary configuration in which the network node 502 embodies a server (e.g., computing device 602), the functionality instruction(s) 518 can comprise or embody computer-accessible instructions that, in response to execution by a processor (e.g., a processor of the one or more processors 608), can permit the server (e.g., computing device 602) to evaluate performance condition(s) of the server and retain a record of such condition(s) in memory (e.g., memory 616). Such computer-accessible instructions can be retained in a memory element, referred to as performance monitoring instruction(s) 618. In another exemplary configuration in which the network node 502 embodies a data manager unit (e.g., data manager 702), the functionality instruction(s) 518 can comprise or embody computer-accessible instructions that, in response to execution by a processor, can permit the server to acquire data indicative of replication latency among a content storage site comprising the data manager unit and other content storage sites deployed in a data layer (e.g., data layer 240). Such computer-accessible instructions of the data manager unit can be retained in a memory element, referred to as signaling beat instruction(s) 618.

Memory 516 can be embodied in a variety of computer-readable media. Exemplary computer-readable media can be any available media that is accessible by a processor in a computing device, such as one processor of the group of one or more processors 508, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be utilized to store the desired information and which can be accessed by a computer or a processor therein or functionally coupled thereto. Memories such as memory 616 and memory 726 which arise from specific configuration of memory 516 also can be embodied in the computer-readable media that embodies memory 516.

Memory 516, and the various configurations thereof such as memory 616 and memory 716, can comprise computer-readable non-transitory storage media in the form of volatile memory, such as random access memory (RAM), electrically erasable programmable read-only memory (EEPROM), and the like, or non-volatile memory such as read only memory (ROM). In one aspect, memory 516 can be partitioned into a system memory (not shown) that can contain data and/or programming modules that enable essential operation and control of the network node 502. Such program modules can be implemented (e.g., compiled and stored) in memory element 522, referred to as operating system (OS) instruction(s) 522, whereas such data can be system data that is retained in memory element 524, referred to as system data storage 524. The OS instruction(s) 522 and system data storage 524 can be immediately accessible to and/or are presently operated on by at least one processor of the group of one or more processors 508. The OS instruction(s) 522 can embody an operating system for the network node. Specific implementation of such OS can depend in part on architectural complexity of the network node 502. Higher complexity affords higher-level OSs. Example operating systems can include Unix, Linux, iOS, Windows operating system, and substantially any operating system for a computing device. In certain scenarios, the operating system embodied in OS instruction(s) 522 can have different levels of complexity based on particular configuration of the network node 502. For example, an operating system for a server (e.g., computing device 602) can be more complex than an operating system for a data manager unit (e.g., data manager 702). In an exemplary configuration in which the network node 502 embodies a server (e.g., computing device 602), the memory element 522 can be embodied or can comprise the memory element, referred to as OS instruction(s) 622. Similarly, in another exemplary configuration in which the network node 502 embodies a data manager unit (e.g., data manager 702), the memory element 522 can be embodied or can comprise the memory element, referred to as OS instruction(s) 622.

Memory 516 can comprise other removable/non-removable, volatile/non-volatile computer-readable non-transitory storage media. As an example, memory 516 can include a mass storage unit (not shown) which can provide non-volatile storage of computer code, computer readable instructions, data structures, program modules, and other data for the network node 502. A specific implementation of such mass storage unit (not shown) can depend on desired form factor of the network node 502 and space available for deployment thereof. For suitable form factors and sizes of the network node 502, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

As illustrated, the network node 502 can comprise a functionality specific platform 510 which can include one or more components the permit functionality of the network node 502. In one embodiment, a component of the one or more components can be a firmware component which can have dedicated resources (e.g., a processor, software, etc.) to implement certain functions that support implementation of or implement at least part of the functionality of the network node 502. In another embodiment, the functionality specific platform 510 can include at least a portion of the one or more processors 508 which can be dedicated to execution of a part or all of the functionality instruction(s) 518, thus relieving at least some of the computational load from the one or more processors 508 for other operation of the network node 502. In one exemplary configuration in which the network node 502 is configured as a server (e.g., computing device 602), the functionality specific platform 510 can be embodied in or can comprise a performance monitoring component 610. In another exemplary configuration in which the network node 502 is configured as a data manager unit (e.g., data manager 702), the functionality specific platform 510 can be embodied in or can comprise a control signal generator unit 710 (also referred to as control signal generator 710).

Features of latency-based routing of queries (e.g., service queries, content queries), and associated load balancing, in accordance with aspects described herein, can be performed, at least in part, in response to execution of software components by a processor. The software components can include one or more implementations (e.g., encoding) of functionality instruction(s) 518 and specific configurations such as performance monitoring instruction(s) or signaling beat instruction(s) 718. In particular, yet not exclusively, to provide the specific functionality of network node 502, or specific configurations thereof such as computing device 602 or data manager 702, a processor of the one or more processors 508 in network node 502, or processor(s) 608 in computing device 602 or processor(s) 708 in data manager 702, can execute at least a portion of the computer-accessible instructions in functionality instruction(s) 518, or particular configuration thereof such as performance monitoring instruction(s) 618 or signaling beat instruction(s) 718.

In general, a processor of the group of one or more processors 508, or processor(s) 608 or processor(s) 708 depending on specific configuration, can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 508 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processors 508 can be implemented as a combination of computing processing units.

The one or more input/output (I/O) interfaces 504 can functionally couple (e.g., communicatively couple) network node 502 to another functional element (component, unit, server, gateway node, repository, etc.) of core network platform 120 or distribution platform 130, for example. Functionality of the network node 502 that is associated with data I/O or signaling I/O can be accomplished in response to execution, by a processor of the group of one or more processors 508, of at least one I/O interface retained in memory element 528. Such memory element is represented by the block I/O interface(s) 528. In some embodiments, the at least one I/O interface embodies an API that permit exchange of data or signaling, or both, via an I/O interface of I/O interface(s) 504. In certain embodiments, the one or more I/O interfaces 504 can include at least one port that can permit connection of the network node 502 to other functional elements of the exemplary network environment 100. In one or more scenarios, the at least one port can comprise network adaptor(s) such as those present in reference links, and other network nodes. In other scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 504 can enable delivery of output (e.g., output data, output signaling) to such functional elements. Such output can represent an outcome or a specific action of one or more actions described herein, such as in the methods of FIG. 8 and FIG. 9A-9B. Specific configurations, or deployments, of the one or more I/O interfaces 504, such as I/O interface(s) 604 in the computing device 602 or I/O interface(s) 704 in the data manager 702, can include at least one feature of the one or more I/O interface(s) 504.

Bus 512, and the various configurations thereof, such as bus 612 and bus 712, represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and the like.

Figure 8:
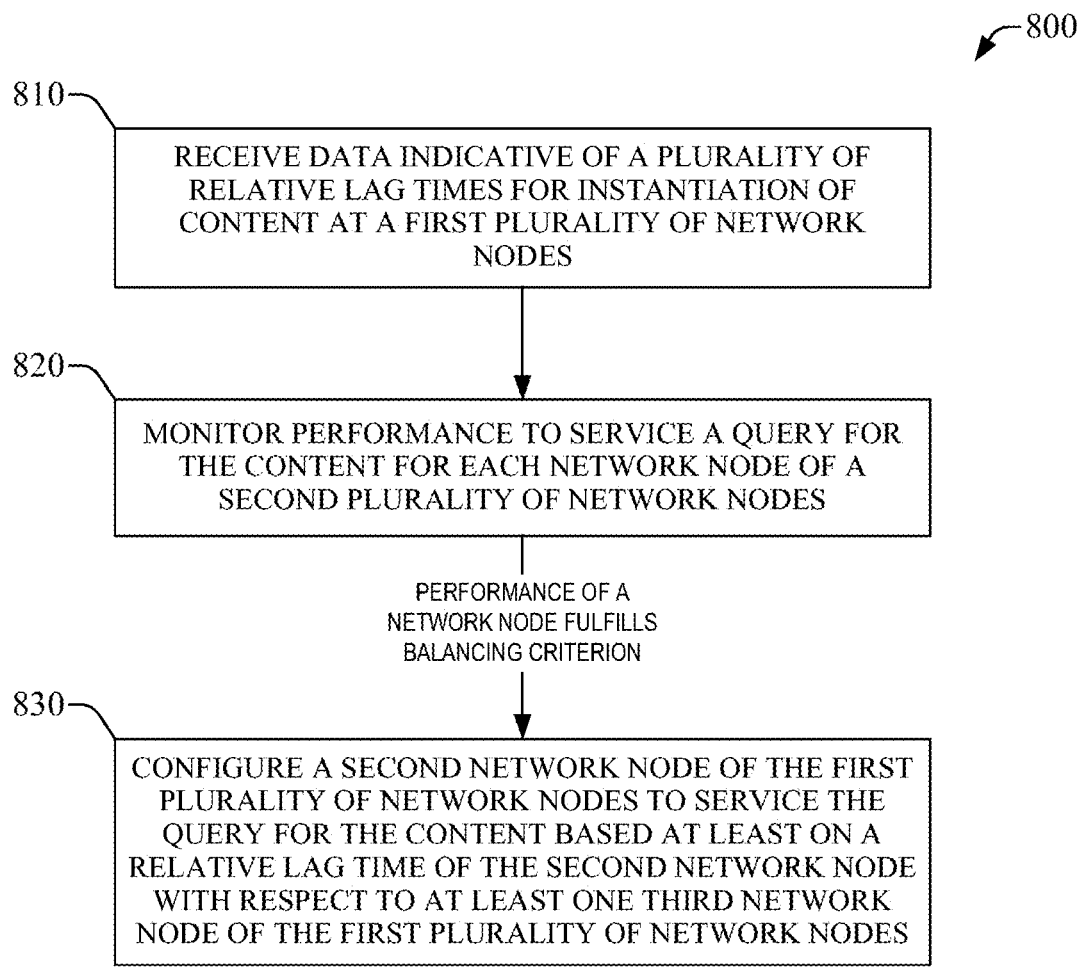
FIG. 8 illustrates an exemplary method in accordance with one or more aspects of the disclosure.
Figure 9A:
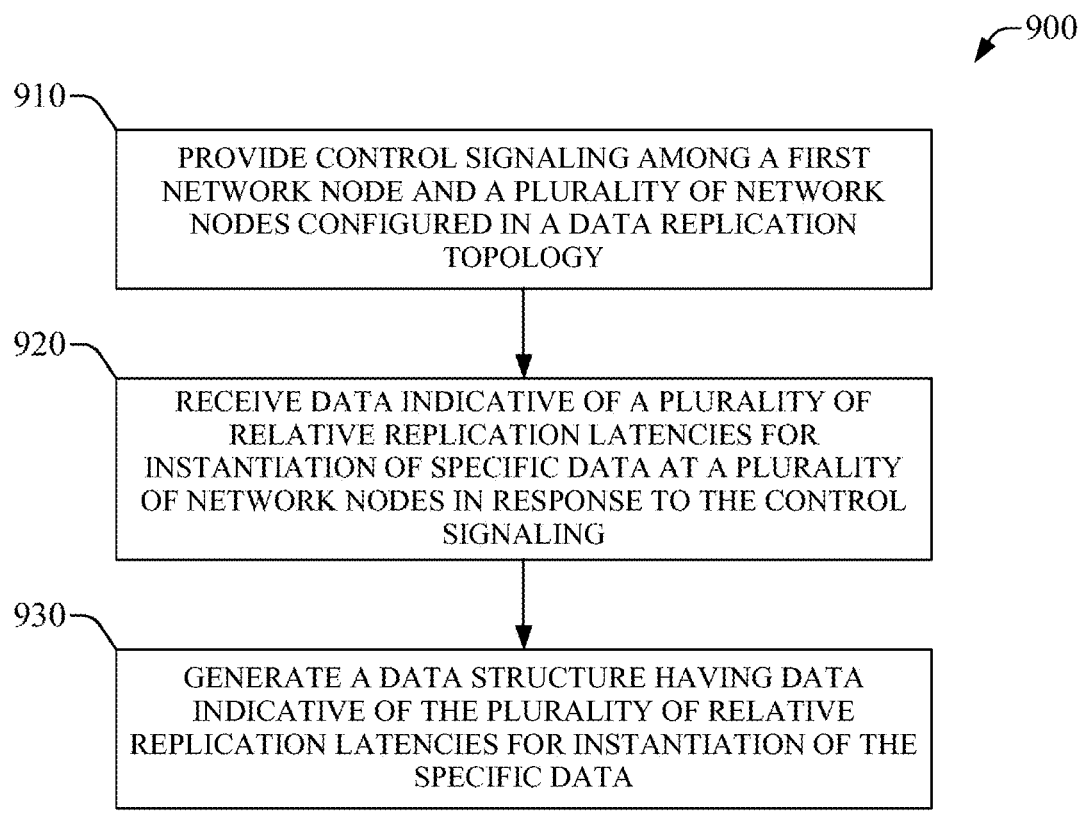
FIG. 9A illustrates an exemplary method in accordance with one or more aspects of the disclosure.
Figure 9B:
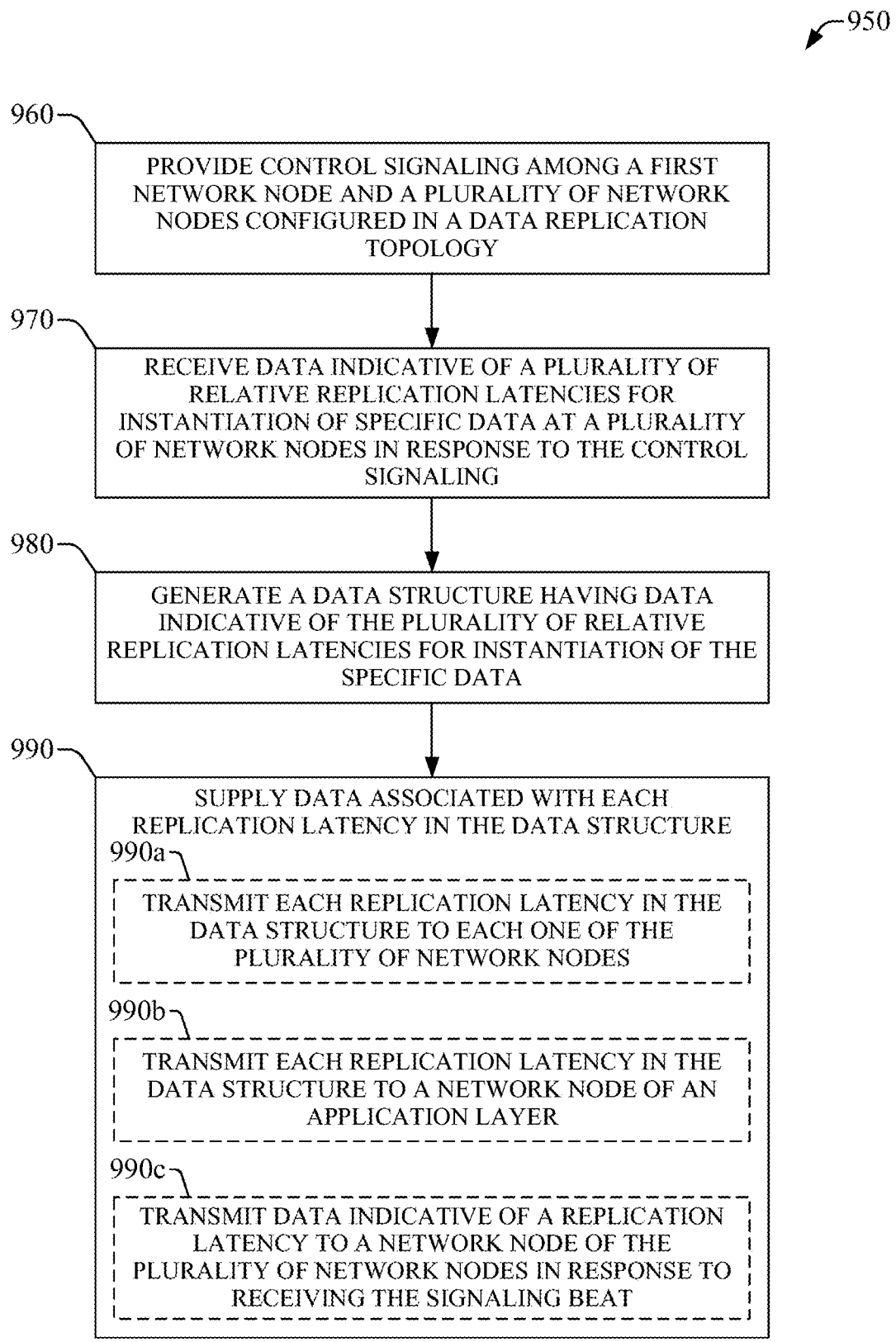
FIG. 9B illustrates an exemplary method in accordance with one or more aspects of the disclosure.

In view of the various aspects of routing of service queries for data/content in a data/content repository with distributed replication topology, such as those described herein, exemplary methods that can be implemented in accordance with the disclosure can be better appreciated with reference to the exemplary flowcharts in FIG. 8 and FIGS. 9A-9B. For simplicity of explanation, the exemplary methods disclosed herein are presented and described as a series of actions (also referred to as steps), pictorially represented with a block. However, it is to be understood and appreciated that implementation, and related advantages, of such methods is not limited by the order of actions, as some actions may occur in different orders and/or concurrently with other actions from that shown and described herein. For example, the various methods (also referred to as processes) of the disclosure can be alternatively represented as a series of interrelated states or events, such as in a state diagram. Moreover, when disparate functional elements (network nodes, units, etc.) implement different portions of the methods of the disclosure, an interaction diagram or a call flow can represent such methods or processes. Furthermore, not all illustrated actions may be required to implement a method in accordance with the subject disclosure.

The methods disclosed throughout the subject specification and annexed drawings can be stored on an article of manufacture, or computer-readable storage medium, to facilitate transporting and transferring such methods to computing devices (e.g., desktop computers, mobile computers, mobile telephones, and the like) for execution, and thus implementation, by a processor or for storage in a memory.

FIG. 8 is a flowchart of exemplary method 800 for latency-based routing of service requests in a content repository in accordance with at least certain aspects of the disclosure. As described herein, the data/content repository can be deployed in an active replication topology (see, e.g., FIG. 2). The exemplary method 800 can be implemented (e.g., performed or executed) by a network node, such as the T&C manager 224, or a processor therein or functionally coupled thereto. At block 810, data indicative of a plurality of relative lag times for instantiation of content (e.g., specific data or specific metadata) at a first plurality of network nodes is received. The first plurality of network nodes can be deployed in a first layer, such as a data layer (e.g., one of the content storage sites $250_1$-$250_Q$, or a data manager therein). Such data can be received at the network node that implements the subject exemplary method. In one aspect, the content can be substantially common to each network node of the first plurality of network nodes. In another aspect each of the network nodes of the first plurality of nodes can be a target node in a data replication topology. Block 810 can be referred to as the receiving action and can comprise polling each one of the first plurality of network nodes for a data structure indicative of the plurality of relative lag times for instantiation of the content. Here, in one aspect, polling includes submitting a request for certain data to a network element (a server, a unit, a device, etc.) and receiving a response, from the network element, the response including the requested data. At block 820, performance to service a query for the content (or service performance for the query) is monitored, or otherwise evaluated, for each network node of a second plurality of network nodes (e.g., servers $214_1$-$214_P$). The second plurality of network nodes can be deployed in a second layer, such as an application layer (e.g., application layer 150). At block 830, in response to such performance (also referred to as service performance) of a first network node fulfilling a balancing criterion (e.g., having certain value for a key performance indicator (KPI) below threshold), a second network node of the first plurality of network nodes in the first layer can be configured to service the query for the content based at least on a relative lag time of the second network node with respect to at least one third network node of the first plurality of network nodes. In one aspect, block 830 can be referred to as the configuring action and can comprise redirecting the query for the specific content to the second network node.

In a scenario in which the service performance for the query does not fulfill the balancing criterion, flow can be directed to block 820 to continue evaluating such service performance. In one implementation, flow of the exemplary method 800 can be redirected to block 810 according to a monitoring protocol to evaluate the service performance, e.g., specific time dependence for implementation of block 820. Such time dependence can establish, at least in part, a nearly-continuous monitoring or a schedule-based monitoring. Event-based monitoring of the service performance of the query also can be implemented.

In certain embodiments, the exemplary method 800 also can include step(s) (not shown) at which an object identifier indicative of the performance to service the query is provided, by each one of the plurality of network nodes in the application layer, for each network node of the plurality of network nodes in the application layer.

FIGS. 9A-9B are flowcharts of exemplary methods for generating information related to replication latency in accordance with at least certain aspects of the disclosure. As described herein, such information can be utilized for routing service requests in a data/content repository having an active replication topology. The exemplary methods 900 and 950 can be implemented (e.g., performed or executed) by a network node, such as a data manager that is part of a content storage site of the group of content storage sites $250_1$-$250_Q$, or a processor therein or functionally coupled thereto. Regarding exemplary method 900, at block 910, control signaling, such as a signaling beat, among a first network node (e.g., data manager $418_2$) and a plurality of network nodes is provided, the first network node and the plurality of network nodes can be configured in a data replication topology. The data replication topology can be deployed in a data layer. The signaling beat can be a periodic control signal as described herein. At block 920, data indicative of a plurality of relative replication latencies for instantiation of specific data at a plurality of network nodes is received in response to the signaling beat. At block 930, a data structure having data indicative of such plurality of relative replication latencies is composed or otherwise generated. The subject block can be referred to as the composing action and can comprise generating an off-diagonal (symmetric or non-symmetric) matrix having matrix elements indicative of relative replication latency among a first network node (e.g., data manager $418_1$) of the plurality of network nodes (e.g., data managers $418_1$-$418_Q$ of content storage sites $250_1$-$250_Q$) and a second network node (e.g., data manager $418_Q$) of the plurality of network nodes.

Regarding exemplary method 950, blocks 960-980 are similar to blocks 910-930, respectively and thus can be implemented in a similar manner. At block 990, data associated with each replication latency in the data structure is supplied. Block 990 can be implemented in various manners. In one aspect, at block 990a, each replication latency in the data structure can be transmitted to each one of the plurality of network nodes (e.g., data managers $418_1$-$418_Q$ of content storage sites $250_1$-$250_Q$). In another aspect, at block 990b, each replication latency in the data structure can be transmitted to a network node of an application layer. In yet another aspect, at block 990c, data indicative of replication latency is transmitted to a network node of the plurality of network nodes in response to receiving the signaling beat. In certain scenarios, implementation of block 990 can comprise implementation of any two of the blocks 990a through 990c. In other scenarios, all three blocks 990a-990c can be implemented.

When compared with conventional technologies for routing traffic or queries to a distributed content repository, various advantages of the disclosure over such technologies emerge from the subject specification. For example, the disclosure can provide routing criteria based at least on relative replication latency and performance conditions, and permit automated determination of routing pathways for content queries and, more generally, traffic.

One or more embodiments of the subject disclosure can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method comprising:
   receiving a user request for a service on a network connected user device;
   identifying, from a plurality of storage nodes associated with the service, a target storage node associated with the user request;
   receiving, at a data manager associated with the network connected user device, a data structure comprising:
      a first plurality of lag times corresponding to communications between a user network node associated with the network connected user device and the plurality of storage nodes; and
      a second plurality of lag times, each lag time of the second plurality of lag times corresponding to a length of time for a first storage node of the plurality of storage nodes to completely replicate content from a second storage node of the plurality of storage nodes;
   determining, based on the first plurality of lag times and the second plurality of lag times, a plurality of total lag times between the user network node and the target storage node via a corresponding path comprising one or more of the plurality of storage nodes;
   identifying a shortest total lag time from the plurality of total lag times; and causing, through the user network node, the target storage node to respond to the user request for the service along a path corresponding to the shortest total lag time.

2. The method of claim 1, further comprising:
receiving, from the data manager, a request for a replication latency topology of the plurality of storage nodes; and
sending, to the data manager, based on the request for the replication latency topology, the data structure comprising the first plurality of lag times and the second plurality of lag times.

3. The method of claim 2, further comprising:
sending a control signal through the user network node to the plurality of storage nodes; and
receiving, based on the control signal, data indicative of the first plurality of lag times and the second plurality of lag times from the user network node.

4. The method of claim 1, further comprising:
determining, based on the user request for the service, that the service is instantiated at the user network node; and
sending a control instruction from the network connected user device to have the user network node service the user request for the service.

5. The method of claim 1, further comprising:
in response to receiving the user request for the service, retrieving a threshold lag time;
comparing the first plurality of lag times to the threshold lag time; and
identifying, based on the comparing, a storage node of the plurality of storage nodes that is associated with a lag time of the first plurality of lag times that satisfies the threshold lag time to service the user request for the service.

6. The method of claim 5, further comprising:
in response to determining, based on the comparing, that none of the first plurality of lag times satisfies the threshold lag time, comparing the second plurality of lag times to the threshold lag time; and
identifying, based on the comparing, a subset of the plurality of storage nodes that collectively are associated with a lag time of the second plurality of lag times which satisfies the threshold lag time to service the user request for the service.

7. The method of claim 1, wherein the user request for the service comprises a request for a media content item.

8. The method of claim 1, wherein the data manager and the user network node are in an application layer, and wherein the plurality of storage nodes are in a data layer.

9. The method of claim 1, further comprising:
comparing performance data of the plurality of storage nodes to one or more service performance criteria; and
selecting at least one storage node of the plurality of storage nodes based at least in part on determining the at least one storage node fulfills the one or more service performance criteria.

10. The method of claim 9, further comprising providing, by each one of the plurality of storage nodes, a respective object identifier indicative of performance data for that storage node of the plurality of storage nodes.

11. A system comprising:
a communication port;
a memory storing instructions; and
control circuitry communicably coupled to the memory and the communication port and configured to execute the instructions to:
receive a user request for a service on a network connected user device;
identify, from a plurality of storage nodes associated with the service, a target storage node associated with the user request;
receive, at a data manager associated with the network connected user device, a data structure comprising:
a first plurality of lag times corresponding to communications between a user network node associated with the network connected user device and the plurality of storage nodes; and
a second plurality of lag times, each lag time of the second plurality of lag times corresponding to a length of time for a first storage node of the plurality of storage nodes to completely replicate content from a second storage node of the plurality of storage nodes;
determine, based on the first plurality of lag times and the second plurality of lag times, a plurality of total lag times between the user network node and the target storage node via a corresponding path comprising one or more of the plurality of storage nodes;
identify a shortest total lag time from the plurality of total lag times; and
cause, through the user network node, the target storage node to respond to the user request for the service along a path corresponding to the shortest total lag time.

12. The system of claim 11, wherein the control circuitry is further configured to:
receive, from the data manager, a request for a replication latency topology of the plurality of storage nodes; and
send, to the data manager, based on the request for the replication latency topology, the data structure comprising the first plurality of lag times and the second plurality of lag times.

13. The system of claim 12, wherein the control circuitry is further configured to:
send, to the plurality of storage nodes, a control signal through the user network node; and
receive, based on the control signal, data indicative of the first plurality of lag times and the second plurality of lag times from the user network node.

14. The system of claim 11, wherein the control circuitry is further configured to:
determine, based on the user request for the service, that the service is instantiated at the user network node; and
send a control instruction from the network connected user device to have the user network node service the user request for the service.

15. The system of claim 11, wherein the control circuitry is further configured to:
in response to receiving the user request for the service, retrieve a threshold lag time;
compare the first plurality of lag times to the threshold lag time; and
identify, based on the comparing, a storage node of the plurality of storage nodes that is associated with a lag time of the first plurality of lag times that satisfies the threshold lag time to service the user request for the service.

16. The system of claim 15, wherein the control circuitry is further configured to:
in response to determining, based on the comparing, that none of the first plurality of lag times satisfies the threshold lag time, compare the second plurality of lag times to the threshold lag time; and
identify, based on the comparing, a subset of the plurality of storage nodes that collectively are associated with a lag time of the second plurality of lag times which satisfies the threshold lag time to service the user request for the service.

17. The system of claim 11, wherein the control circuitry configured to receive the user request for the service is further configured to receive a request for a media content item.

18. The system of claim 11, wherein the control circuitry configured to receive the data structure from the data manager and the plurality of storage nodes is further configured to interface with the data manager and the user network node through an application layer, and wherein the control circuitry configured to receive the data structure from the plurality of storage nodes is further configured to interface with the plurality of storage nodes through a data layer.

19. The system of claim 11, wherein the control circuitry is further configured to:
   compare performance data of the plurality of storage nodes to one or more service performance criteria; and
   select at least one storage node of the plurality of storage nodes based at least in part on determining the at least one storage node fulfills the one or more service performance criteria.

20. The system of claim 19, wherein the control circuitry is further configured to provide, by each one of the plurality of storage nodes, a respective object identifier indicative of performance data for that storage node of the plurality of storage nodes.

* * * * *